(12) United States Patent
Yokotani et al.

(10) Patent No.: US 7,157,904 B1
(45) Date of Patent: Jan. 2, 2007

(54) MAGNETIC DETECTION APPARATUS

(75) Inventors: Masahiro Yokotani, Tokyo (JP); Naoki Hiraoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/447,104

(22) Filed: Jun. 6, 2006

(30) Foreign Application Priority Data

Jan. 20, 2006 (JP) .............................. 2006-012623

(51) Int. Cl.
  *G01B 7/30* (2006.01)
(52) U.S. Cl. ...................... 324/207.21; 324/207.25; 324/174; 324/260
(58) Field of Classification Search ...................... None
  See application file for complete search history.

(56) References Cited

U.S. PATENT DOCUMENTS

| | | | | |
|---|---|---|---|---|
| 5,821,745 A * | 10/1998 | Makino et al. | ........ | 324/207.25 |
| 5,982,171 A * | 11/1999 | Umemoto et al. | ..... | 324/207.21 |
| 6,177,793 B1 * | 1/2001 | Shinjo et al. | .......... | 324/207.25 |
| 6,528,992 B1 * | 3/2003 | Shinjo et al. | .......... | 324/207.21 |
| 6,577,122 B1 * | 6/2003 | Yokotani et al. | ....... | 324/207.21 |
| 6,630,821 B1 * | 10/2003 | Shinjo et al. | .......... | 324/207.21 |
| 6,977,497 B1 * | 12/2005 | Yokotani et al. | ....... | 324/207.21 |
| 2005/0264435 A1 * | 12/2005 | Bicking | ....................... | 341/15 |

FOREIGN PATENT DOCUMENTS

JP    2004-109113 A    4/2004

* cited by examiner

*Primary Examiner*—Jay M. Patidar
(74) *Attorney, Agent, or Firm*—Sughrue Mion, PLLC

(57) ABSTRACT

A magnetic detection apparatus is able to make a selection between AC coupling and DC coupling thereby to improve the accuracy of a final output signal corresponding to a magnetic movable element, thus making it possible to ensure excellent detection performance. The magnetic detection apparatus with a sensor composed of magnetoresistive elements (2a, 2b) for detecting the strength of a magnetic field includes a first comparison circuit (31) that has a first comparison level (VR1), and waveform shapes the amplitude of a detection signal (C) from the magnetoresistive elements (2a, 2b) through DC coupling, a second comparison circuit (32) that has a second comparison level (VR2), and waveform shapes the amplitude of the detection signal C through DC coupling, and a third comparison circuit (33) that has a third comparison level VR3, and waveform shapes the amplitude of the detection signal C after AC coupling.

4 Claims, 11 Drawing Sheets

MAGNETIC DETECTION APPARATUS

BACKGROUND OF THE INVENTION

1. Field of the Invention

The present invention relates to a magnetic detection apparatus with a sensor (magnetoresistive element) for detecting the strength of an impressed magnetic field by magnetoelectric conversion, and more particularly, it relates to a magnetic detection apparatus for detecting irregularities of a magnetic movable element when power is turned on and thereafter.

2. Description of the Related Art

In the past, in order to detect irregularities of a magnetic movable element when power is turned on and thereafter, for example, it has been well known to use a magnetic detection apparatus with a sensor in the form of a magnetoelectric conversion element (e.g., magnetoresistive element) (see, for example, a first patent document: Japanese patent application laid-open No. 2004-109113).

Hereinafter, reference will be made to a conventional magnetic detection apparatus as described in the above-mentioned first patent document while referring to the accompanying drawings.

FIG. 6 and FIG. 7 are a perspective view and an enlarged plan view, respectively, that show the conventional magnetic detection apparatus. FIG. 8 and FIG. 9 are circuit configuration diagrams showing processing circuits of the conventional apparatus, wherein FIG. 8 shows a circuit configuration for DC processing the amplitude of a detection signal obtained by a change in the resistance of a magnetoresistive element, and FIG. 9 shows a circuit configuration for AC processing the amplitude of the detection signal obtained by a change in the resistance of the magnetoresistive element. FIG. 10 is a timing chart illustrating the operation waveforms of the detection signal DC processed by the circuit configuration of FIG. 8, and FIG. 11 is a timing chart illustrating the operation waveforms of the detection signal AC processed by the circuit configuration of FIG. 9.

In FIG. 6 and FIG. 7, the conventional magnetic detection apparatus includes a magnet 1 for generating a bias magnetic field and a sensor 2 mounted on an upper surface of the magnet 1. The sensor 2 is composed of an IC chip having a first magnetoresistive element 2a and a second magnetoresistive element 2b integrally formed as segments. For example, the first and second magnetoresistive elements 2a, 2b are arranged in opposition to a magnetic movable element 3 and in a side by side relation in the direction of movement of the magnetic movable element 3 (see arrows).

As shown in FIG. 6 and FIG. 7, by arranging the sensor 2 of the magnetic detection apparatus in the vicinity of and in opposition to the magnetic movable element 3 in a side by side relation in the direction of movement of the magnetic movable element 3, the resistance values of the magnetoresistive elements 2a, 2b are changed in accordance with the change in position or movement of the magnetic movable element 3.

In FIG. 8 and FIG. 9, the first and second magnetoresistive elements 2a, 2b are connected in series with each other between a power supply Vcc and ground to form a bridge circuit 10, whereby a detection signal is output from a junction between the first and second magnetoresistive elements 2a, 2b.

In the DC processing circuit A shown of in FIG. 8, a detection signal c of the bridge circuit 10 is input to a comparison circuit 11 where it is compared with a comparison level VR to be waveform shaped into a rectangular wave. An output signal e of the comparison circuit 11 is then made into a final output signal i corresponding to the magnetic movable element 3 through transistors 12, 13, which is in turn output from an output terminal Vout.

In addition, in the AC processing circuit shown in FIG. 9, a detection signal c of the bridge circuit 10 is input to the comparison circuit 14 as a voltage signal d through a high-pass filter comprising a capacitor 22 and a resistor 23, so that it is compared with a comparison level VRa to be waveform shaped into a rectangular wave. An output signal g of the comparison circuit 14 is then made into a final output signal j corresponding to the magnetic movable element 3 through transistors 12, 13, which is in turn output from an output terminal Vout.

According to the DC processing circuit of FIG. 8, the detection signal c obtained from the bridge circuit 10 in accordance with the movement of the magnetic movable element 3 is converted into the output signal i, as shown in FIG. 10. That is, the detection signal c is converted into the rectangular wave signal e by the comparison level VR of the comparison circuit 11, and the rectangular wave signal e is made into the final output signal i through the transistors 12, 13.

In addition, according to the AC processing circuit of FIG. 9, the detection signal c is converted into the output signal j, as shown in FIG. 11. That is, the detection signal c is made into the voltage signal d with its phase advanced through the high-pass filter comprising the capacitor 22 and the resistor 23, and the voltage signal d is converted into the rectangular wave signal g by the comparison level VRa of the comparison circuit 14, and the rectangular wave signal g is made into the final output signal j through the transistors 12, 13.

Next, reference will be made to an operation of the conventional apparatus as shown in FIGS. 6 through 11 in relation to a problem thereof while referring to FIG. 12 and FIG. 13. FIG. 12 is a timing chart illustrating operation waveforms in the case of the DC processing circuit of FIG. 8 being used, wherein the operation waveforms at normal or room temperature (R.T) and at high temperature (HOT) are respectively shown in comparison with each other. FIG. 13 is a timing chart illustrating operation waveforms in the case of the AC processing circuit of FIG. 9 being used, wherein the operational waveforms at high speed rotation and at low speed rotation are respectively shown in comparison with each other.

In FIG. 12, a temperature offset is caused by variation in the resistance temperature coefficients of the magnetoresistive elements 2a, 2b or variation in the strength of the magnetic field impressed to the magnetoresistive elements 2a, 2b between a detection signal c at room temperature (R.T) and a detection signal c' at high temperature (HOT). Here, it is found that a large temperature-induced displacement or shift in the rising and falling points of the rectangular wave signals e, e' is caused by a temperature offset between the detection signals c, c', and hence a difference Δi between the temperature characteristics of the final output signals i, i' becomes large. Similarly, it is also found in FIG. 13 that a large shift is caused in the rising and falling points of the rectangular wave signals g, g' in accordance with a difference in the number of revolutions per minute of the magnetic movable element 3, thus resulting in an increased difference Δj between the rotation number characteristics of the final output signals i, i'.

Since in the conventional magnetic detection apparatus, only the DC processing circuit of FIG. 8 or the AC processing circuit of FIG. 9 has been used, there arises the following problem. That is, a temperature offset is caused in the detection signals c, c' due to variation in the magnetoresistive elements 2a, 2b and/or in the strength of magnetic field, so that the difference Δi between the temperature characteristics of the final output signals becomes large, as shown in FIG. 12, or the difference Δj between the temperature characteristics of the final output signals becomes large by the difference in the number of revolutions of the magnetic movable element 3, as shown in FIG. 13.

SUMMARY OF THE INVENTION

Accordingly, the present invention is intended to solve the problem as referred to above, and has for its object to obtain a magnetic detection apparatus which is capable of improving the accuracy of a final output signal corresponding to a magnetic movable element to thereby ensure excellent detection performance.

Bearing the above object in mind, according to the present invention, there is provided a magnetic detection apparatus with a sensor composed of a magnetoelectric conversion element for detecting the strength of a magnetic field. The apparatus includes: a first comparison circuit that has a first comparison level, and waveform shapes the amplitude of a detection signal from the magnetoelectric conversion element through DC coupling; a second comparison circuit that has a second comparison level, and waveform shapes the amplitude of the detection signal from the magnetoelectric conversion element through DC coupling; and a third comparison circuit that has a third comparison level, and waveform shapes the amplitude of the detection signal from the magnetoelectric conversion element after AC coupling.

According to the present invention, a selection between AC coupling and DC coupling becomes possible, so the accuracy of the final output signal corresponding to the magnetic movable element can be improved, thereby making it possible to ensure excellent detection performance.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Now, a preferred embodiment of the present invention will be described below in detail while referring to the accompanying drawings.

Embodiment 1

Figure 1:
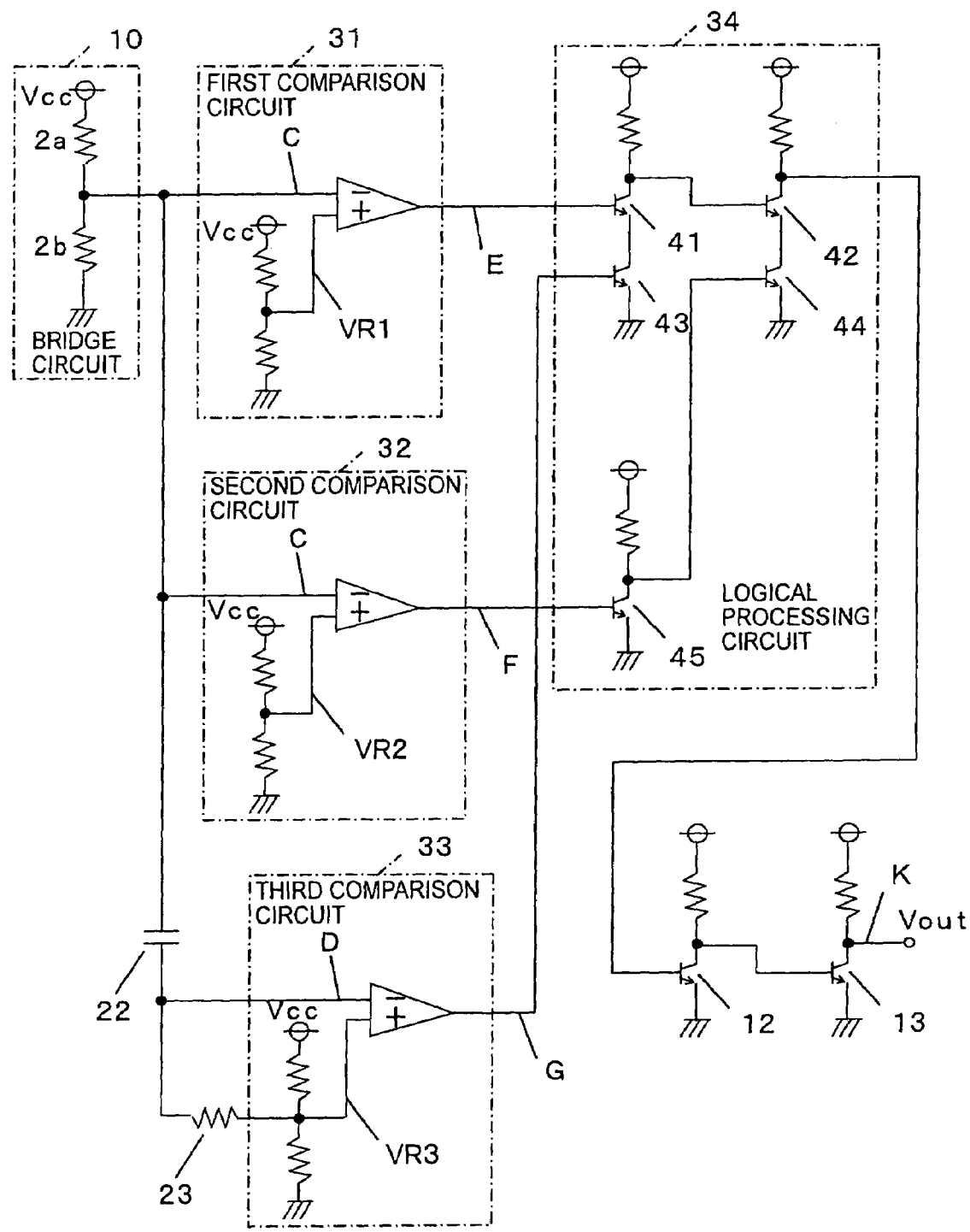
FIG. 1 is a circuit configuration diagram showing a processing circuit of a magnetic detection apparatus according to a first embodiment of the present invention.
Figure 2:
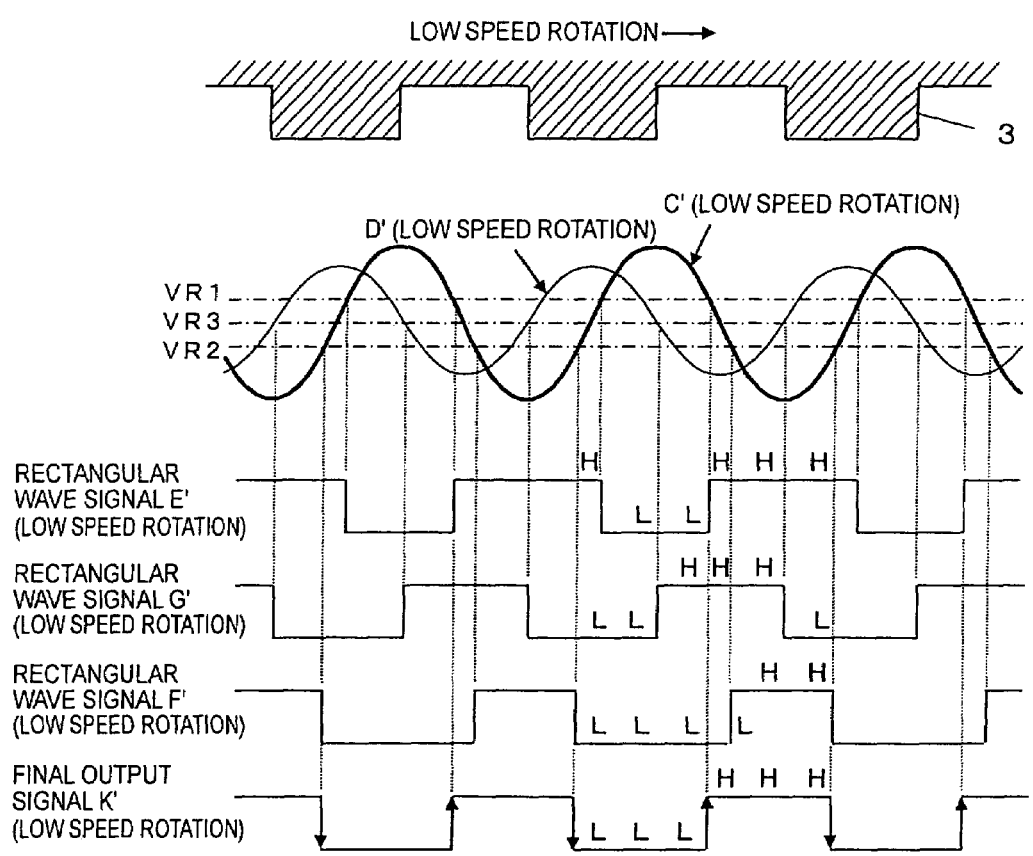
FIG. 2 is a timing chart illustrating operation waveforms at the time when a magnetic movable element is rotating at low speed according to the first embodiment of the present invention.
Figure 3:
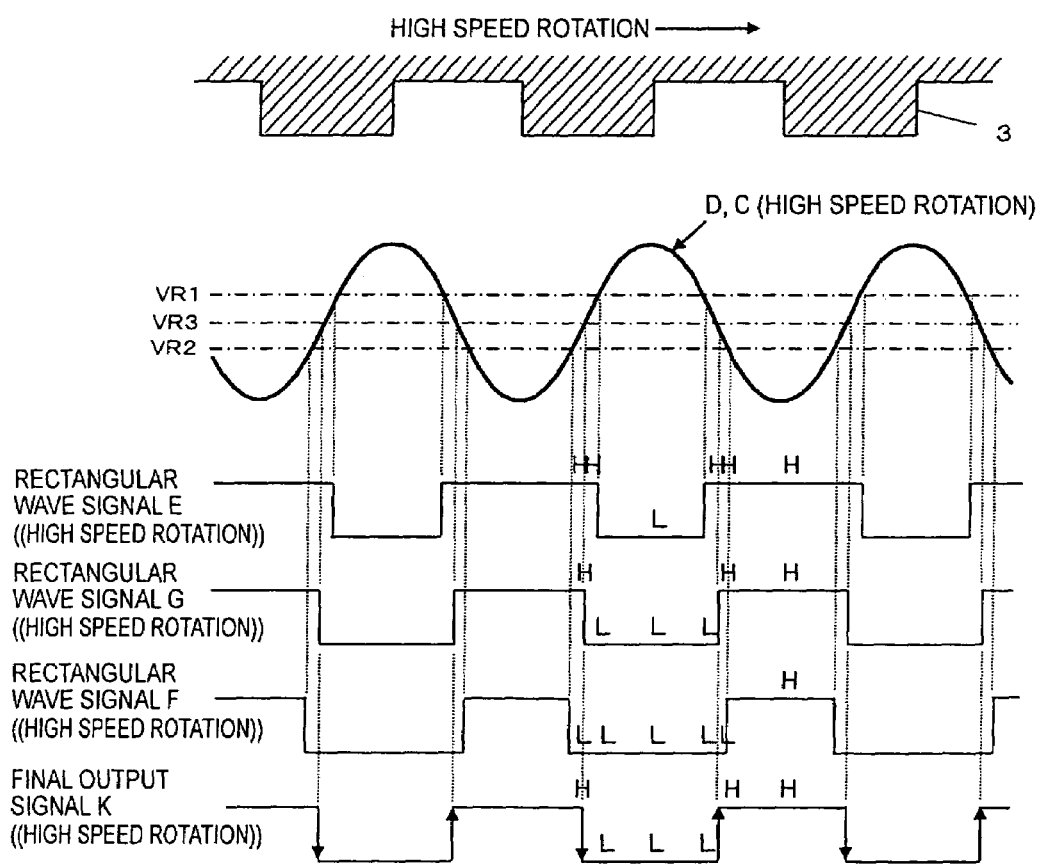
FIG. 3 is a timing chart illustrating operation waveforms at the time when the magnetic movable element is rotating at high speed according to the first embodiment of the present invention.
Figure 6:
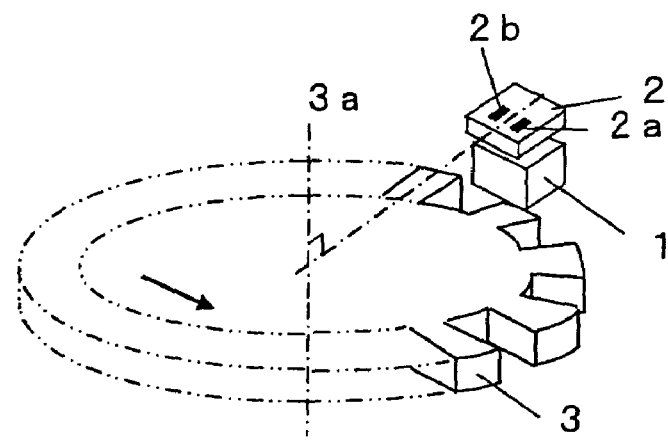
FIG. 6 is a perspective view of a magnetic circuit of a conventional magnetic detection apparatus.
Figure 7:
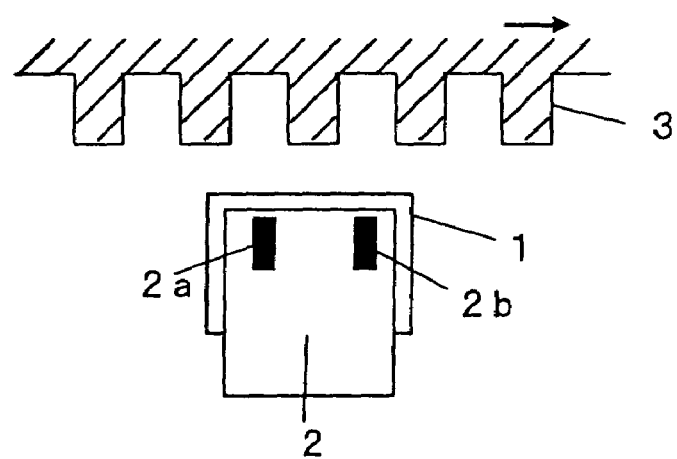
FIG. 7 is a plan view showing on an enlarged scale the magnetic circuit configuration of the conventional magnetic detection apparatus.
Figure 8:
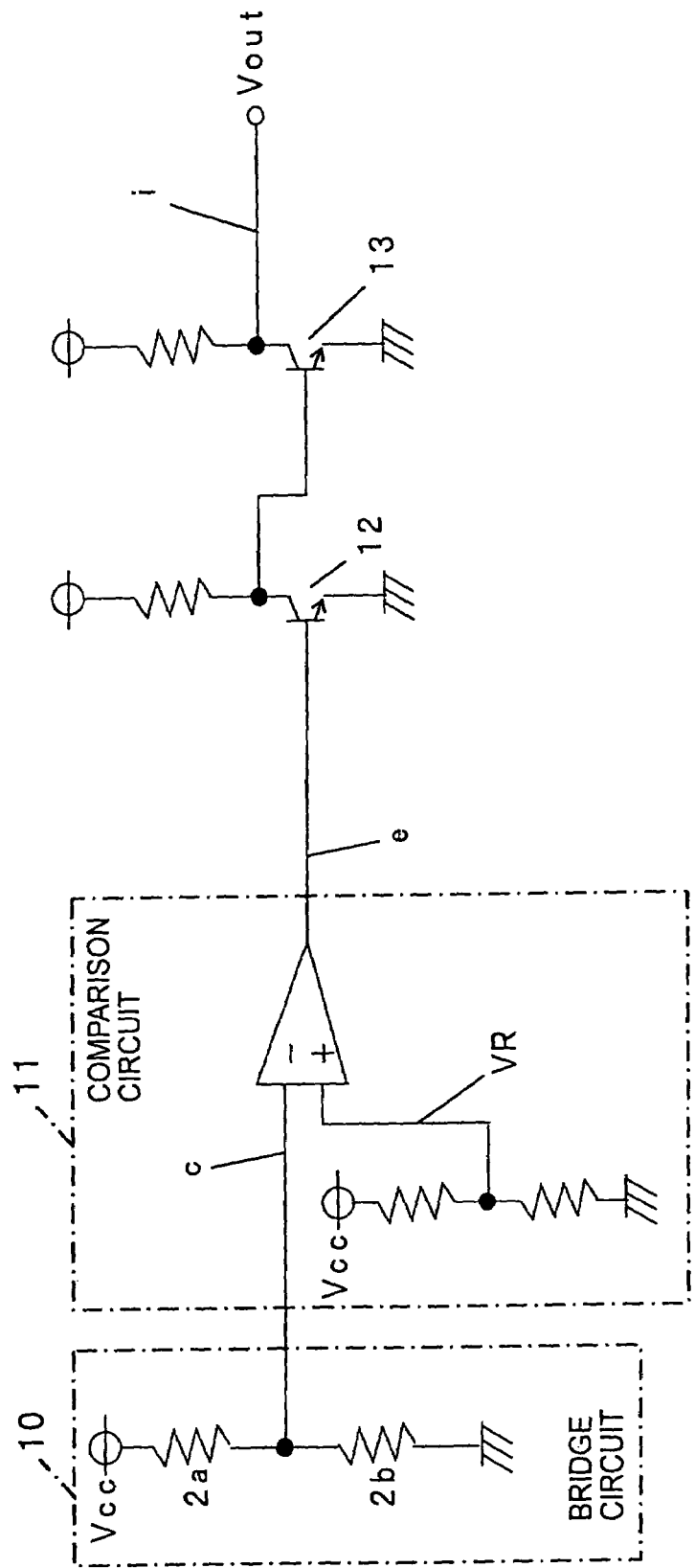
FIG. 8 is a circuit configuration diagram showing a processing circuit using DC coupling in the conventional magnetic detection apparatus.
Figure 9:
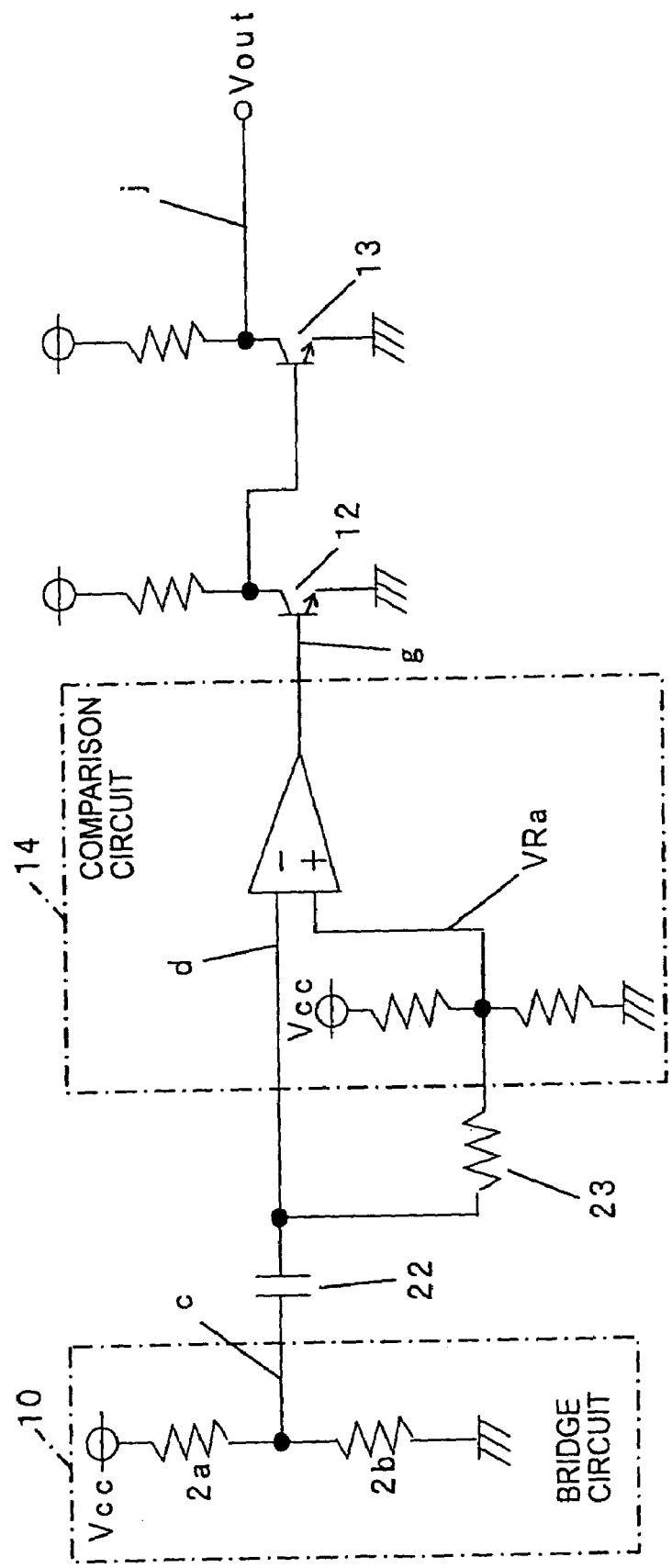
FIG. 9 is a circuit configuration diagram showing a processing circuit using AC coupling in the conventional magnetic detection apparatus.
Figure 10:
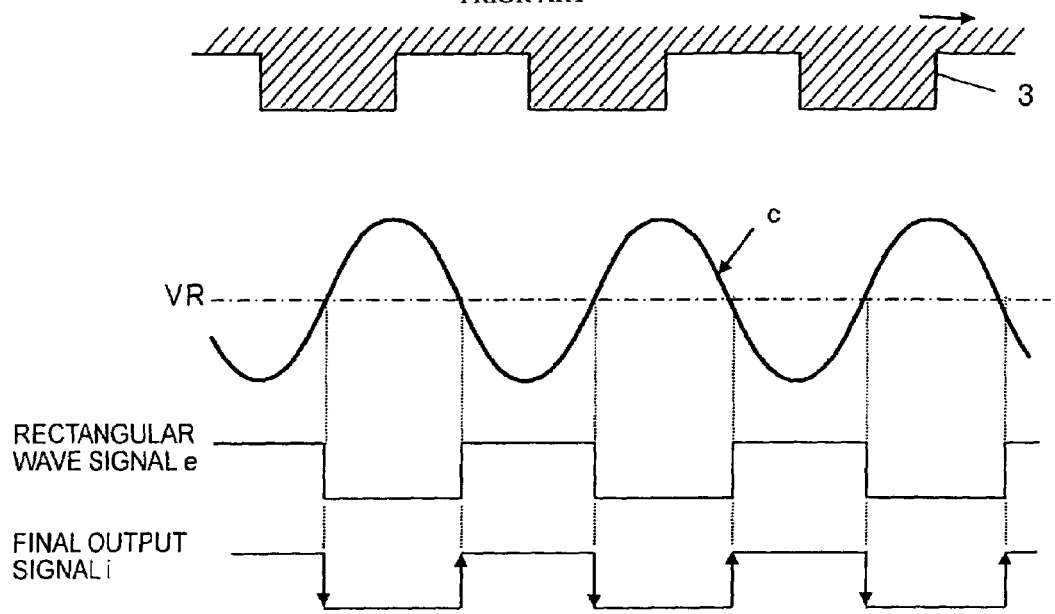
FIG. 10 is a timing chart illustrating operation waveforms in the magnetic detection apparatus of FIG. 8.
Figure 11:
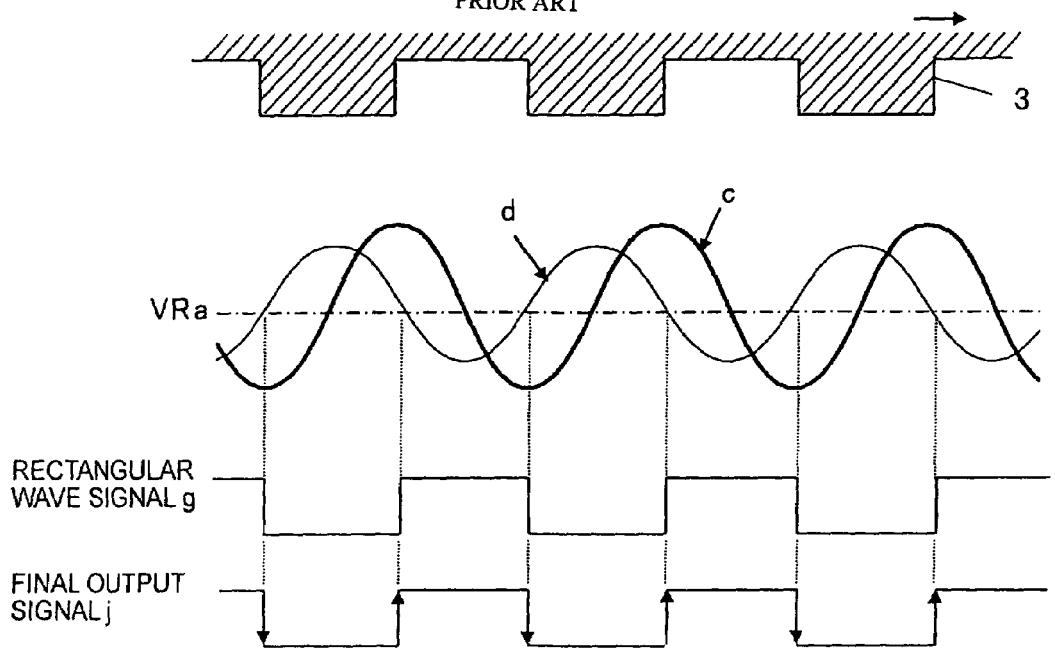
FIG. 11 is a timing chart illustrating operation waveforms in the magnetic detection signal apparatus of FIG. 9.

FIG. 1 is a circuit configuration diagram that shows a processing circuit of a magnetic detection apparatus according to a first embodiment of the present invention, wherein the same or like parts or elements as those described before (see FIGS. 8 and 9) are identified by the same symbols. FIGS. 2 and 3 are timing charts illustrating operation waveforms of signals processed by the processing circuit of FIG. 1, wherein FIG. 2 shows the operation waveforms of respective signals at the time when the number of revolutions per minute of a magnetic movable element 3 is low, and FIG. 3 shows the operation waveforms of the respective signals at the time when the number of revolutions per minute of the magnetic movable element 3 is high. Here, note that individual signals C through E and G in FIG. 1 through FIG. 3 correspond to the above-mentioned signals c through e and g (see FIG. 8 through FIG. 13), respectively, and the construction of a sensor 2 comprising magnetoresistive elements 2a, 2b is as shown in FIG. 6 and FIG. 7.

In FIG. 1, the magnetic detection apparatus according to the first embodiment of the present invention is provided with a bridge circuit 10, a first comparison circuit 31, a second comparison circuit 32, a third comparison circuit 33, a logical processing circuit 34, output transistors 12, 13, and an output terminal Vout. The bridge circuit 10 constitutes a sensor that detects the strength of a magnetic field, and includes two magnetoresistive elements 2a, 2b as a magnetoelectric conversion element, as stated above.

In the bridge circuit 10, the resistance values of the magnetoresistive elements 2a, 2b change in accordance with the displacement or positional change of the magnetic movable element 3, so that the detection signal C of the bridge circuit 10 is thereby caused to change in voltage, as previously stated. The detection signal C of the bridge circuit 10 is input to the first and second comparison circuits 31, 32, and also input to the third comparison circuit 33 through a high-pass filter comprising a capacitor 22 and a resistor 23. The first comparison circuit 31 has a first comparison level VR1, waveform shapes the amplitude of the detection signal C with its DC coupling, and outputs a rectangular wave signal E. The second comparison circuit 32 has a second comparison level VR2 that is different from the first comparison level VR1, waveform shapes the amplitude of the detection signal C with DC coupling, and outputs a rectangular wave signal F. The third comparison circuit 33 has a third comparison level VR3 that is between the first comparison level VR1 and the second comparison level VR2, waveform shapes the amplitude of the detection signal C after AC coupling thereof, and outputs a rectangular wave signal G Hereinafter, the first through third comparison levels VR1 through VR3 are simply referred to as "the comparison levels", respectively.

Specifically, the detection signal C is compared with the comparison level VR1 in the first comparison circuit 31 and converted into the rectangular wave signal E, and at the same time, it is compared with the comparison level VR2 in the second comparison circuit 32 and converted into the rectangular wave signal F. In addition, the detection signal C is converted into a voltage signal D by AC processing through the high-pass filter comprising the capacitor 22 and the resistor 23, which is then compared with the comparison level VR3 in the third comparison circuit 33 and converted into the rectangular wave signal G The respective output signals E, F, G of the first, second and third comparison circuits 31, 33, 33 are logically processed by the logical processing circuit 34 and then output through the transistors 12, 13 as a final output signal K.

The logical processing circuit includes first and second transistors 41, 42 that are inserted in series between a power supply Vcc and the ground, third and fourth transistors 43, 44 that are inserted in series between the power supply Vcc and the ground, and a fifth transistor 45 that is inserted between the power supply Vcc and the ground, wherein an output signal of the second transistor 42 is input to the output transistor 12 as a final output signal.

Hereinafter, the first through fifth transistors 41 through 45 are simply referred to as "the transistors", respectively. The transistor 41 is turned on and off by the output signal E of the first comparison circuit 31, and the transistor 42 is turned on and off by the output signal of the transistor 41. The transistor 43 is connected in series to the transistor 41, and turned on and off by the output signal G of the third comparison circuit 33. The transistor 45 is turned on and off by the output signal F of the second comparison circuit 32. The transistor 44 is connected in series to the transistor 42, and turned on and off by the output signal of the transistor 45.

Specifically, the transistor 41 has an emitter terminal thereof connected to a collector terminal of the transistor 43, a collector terminal (output terminal) thereof connected to a base terminal of the transistor 42 and at the same time to the power supply Vcc through a resistor, and a base terminal thereof impressed with the rectangular wave signal E from the first comparison circuit 31. Also, the transistor 42 has the base terminal thereof connected to the output terminal of the transistor 41, an emitter terminal thereof connected to a collector terminal of the transistor 44, a collector terminal (output terminal) thereof connected to the power supply Vcc through a resistor, the collector terminal serving to constitute a final output terminal. n addition, the transistor 45 has an emitter terminal thereof grounded, a collector terminal (output terminal) thereof connected to a base terminal of the transistor 44 and to the power supply Vcc through a resistor, and a base terminal impressed with the rectangular wave signal F from the second comparison circuit 32. Further, the transistor 44 has an emitter terminal thereof grounded, and the collector terminal thereof connected to the emitter terminal of the transistor 42.

In the logical processing circuit 34 as constructed above, the transistors 41, 43 together constitute an AND gate of the inverting input type, the transistors 42, 44 together constitute an AND gate of the inverting input type, and the transistor 45 constitutes an inverter. The output transistors 12, 13 together constitute an amplifier for amplifying the final output signal K.

Accordingly, the logic level of the final output signal K changes, as shown in the following cases (1) through (8), in accordance with the combinations of the logic levels of the output signals E, F, G of the first through third comparison circuits 31 through 33.

(1) In case of E, G, F being "H (high), H, H", K="H (high)".
(2) In case of E, G, F being "H, H, L (low)", K="H".
(3) In case of E, G, F being "H, L, H", K="H".
(4) In case of E, G, F being "H, L, L", K="L".
(5) In case of E, G, F being "L, H, H", K="H".
(6) In case of E, G, F being "L, H, L", K="L".
(7) In case of E, G, F being "L, L, H", K="H".
(8) In case of E, G, F being "L, L, L", K="L".

Next, the operation of the first embodiment of the present invention will be explained while referring to FIG. 1 through FIG. 3. FIG. 2 shows the operation waveforms of respective signals C' through G' and K' at the time when the number of revolutions per minute of a magnetic movable element 3 is low, and FIG. 3 shows the operation waveforms of respective signals C through G and K at the time when the number of revolutions per minute of the magnetic movable element 3 is high.

In FIG. 2, as is clear from the combinations of voltage levels "H (high) and L (low)" of the respective signals "E° F', G', K'", the rising timing "L to H" of a final output signal K' at the low speed rotation of the magnetic movable element 3 is the same as the rising timing of a rectangular wave signal E' from the first comparison circuit 31. Also, the falling timing "H to L" of the final output signal K' at the low speed rotation of the magnetic movable element 3 is the same as the falling timing of a rectangular wave signal F' from the second comparison circuit 32. On the other hand, in FIG. 3, both the rising timing and the falling timing of the final output signal K at the high speed rotation of the magnetic movable element 3 are the same as those of the rectangular wave signal G from the third comparison circuit 33. In other words, switching is made in such a manner that when the magnetic movable element 3 is at low speed rotation, the DC-processed output signals E, F from the first and second comparison circuits 31, 32 are used, whereas when the magnetic movable element 3 is at high speed rotation, the AC-processed output signal G from the third comparison circuit 33 is used. At this time, a phase difference between the DC-processed rectangular wave signals E, F from the first and second comparison circuits 31, 32 and the AC-processed rectangular wave signal G from the third comparison circuit 33 necessarily or invariably becomes equal to or less than ¼ of the period of rotation, so it is possible to obtain the final output signal K without any trouble irrespective of the number of revolutions per minute of the magnetic movable element 3.

In addition, the timing for switching between when the DC processing of the first and second comparison circuits 31, 32 is applied and when the AC processing of the third comparison circuit 33 is applied can be arbitrarily set by adjusting the circuit constant of the high-pass filter that is formed of the capacitor 22 and the resistance 23.

Now, reference will be made to the operational effects obtained by the magnetic detection apparatus according to the first embodiment of the present invention while referring to FIG. 4 and FIG. 5.

Figure 4:
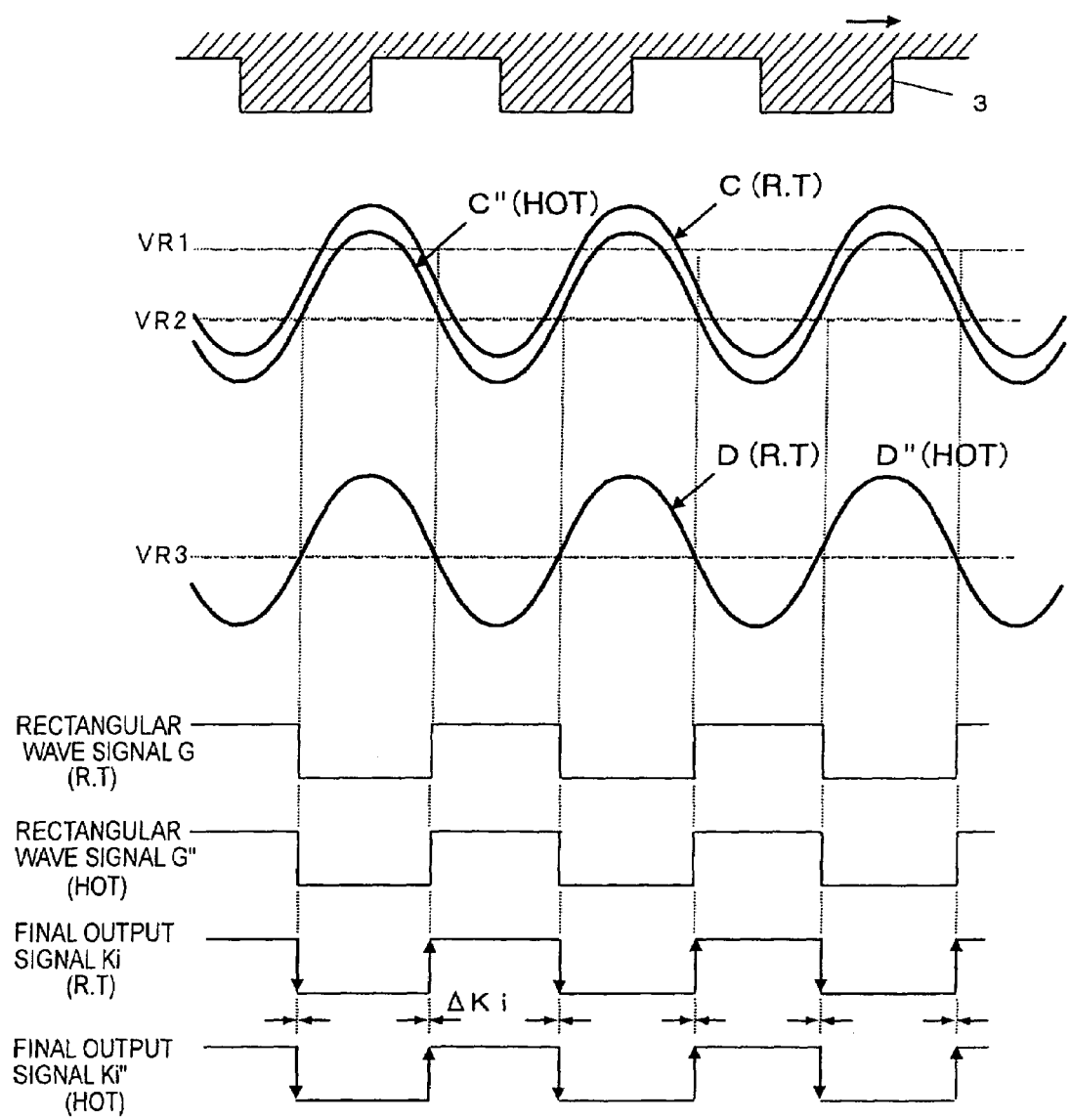
FIG. 4 is a timing chart illustrating the operation waveforms to explain the reduction effect of a difference between temperature coefficients according to the first embodiment of the present invention.
Figure 5:
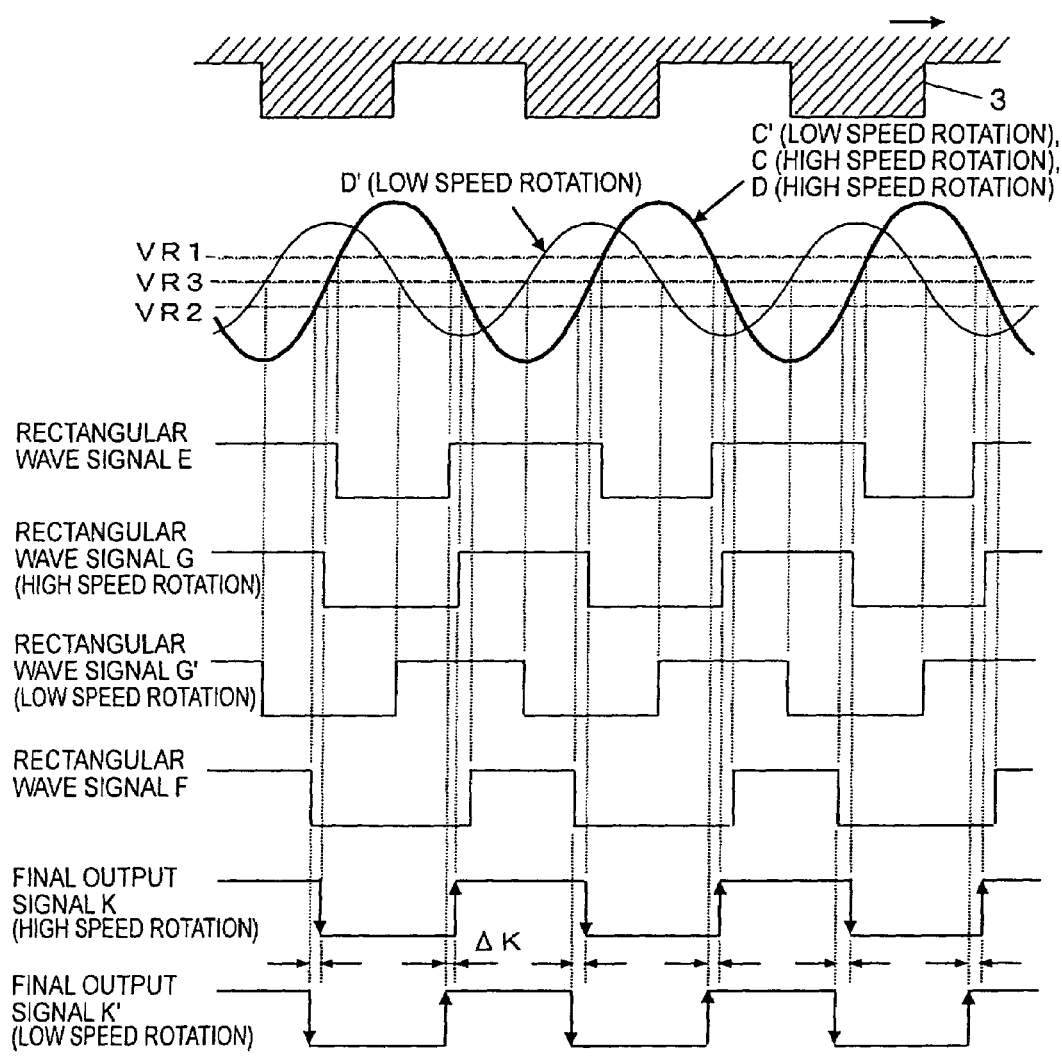
FIG. 5 is a timing chart illustrating the operation waveforms to explain the reduction effect of a difference between the rotation number characteristics according to the first embodiment of the present invention.
Figure 12:
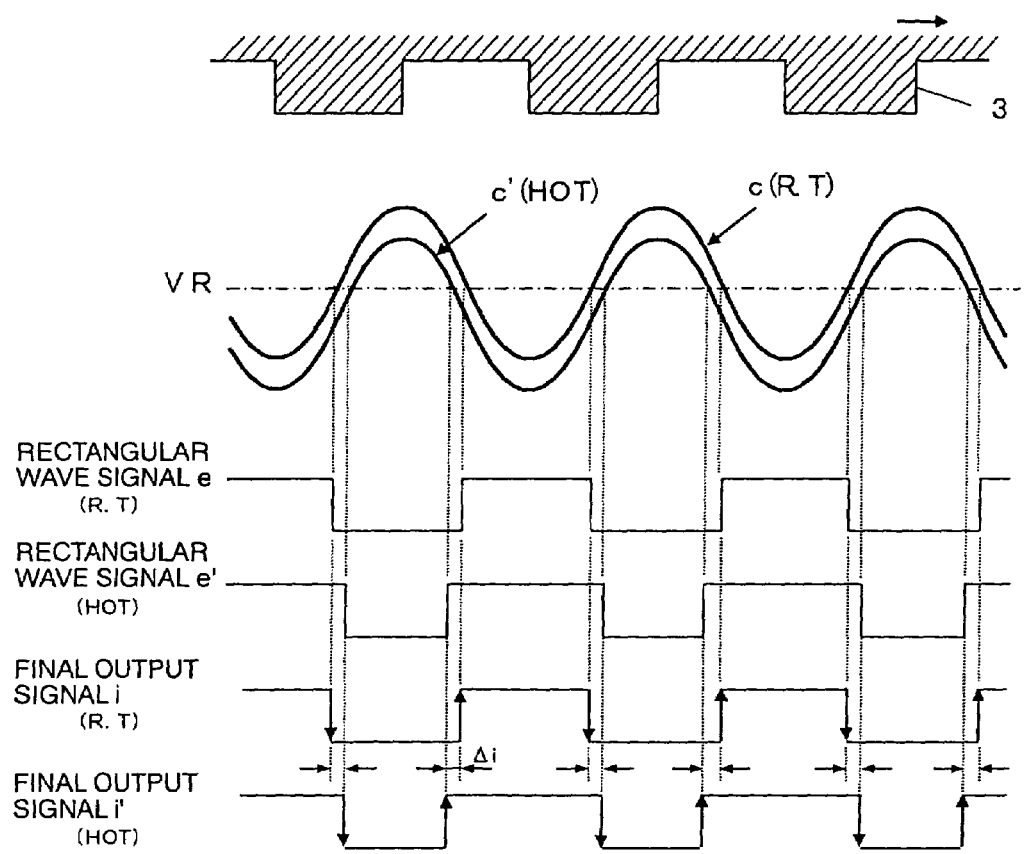
FIG. 12 is a timing chart illustrating operation waveforms to explain a difference between temperature coefficients generated by the conventional magnetic detection apparatus.
Figure 13:
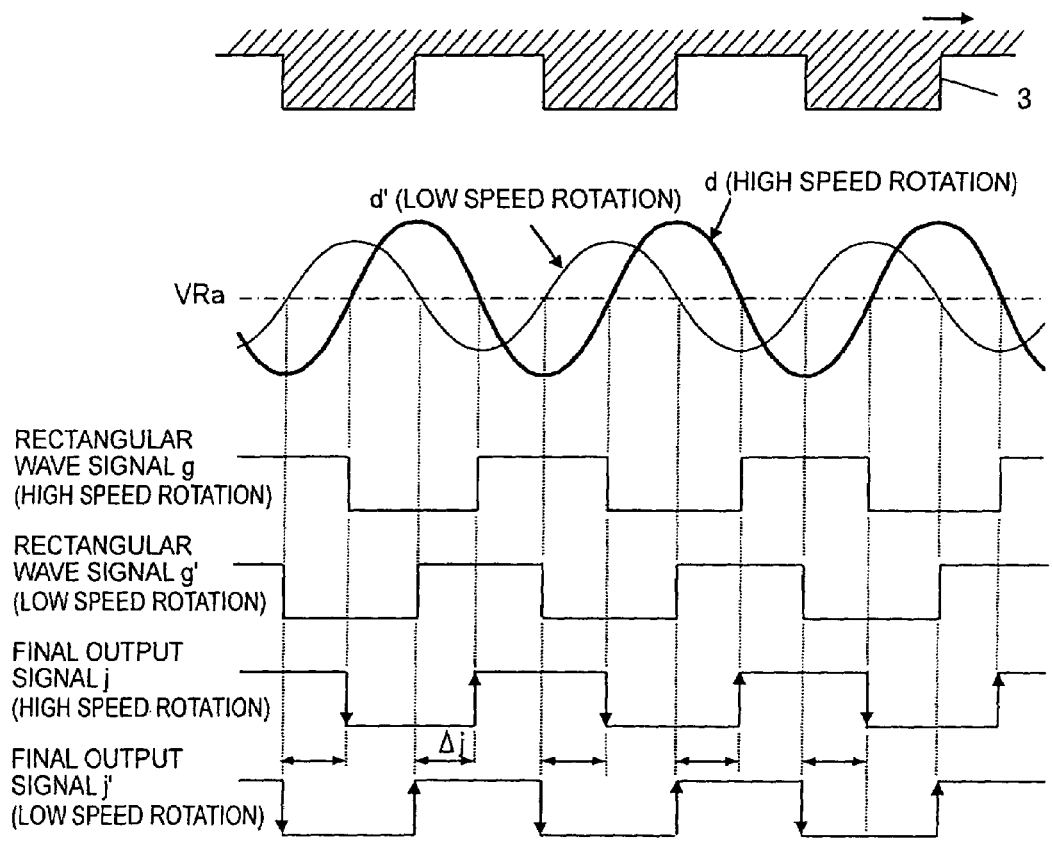
FIG. 13 is a timing chart illustrating operation waveforms to explain a difference between rotation number characteristics generated by the conventional magnetic detection apparatus.

FIG. 4 and FIG. 5 are timing charts for explaining the operational effects obtained by the first embodiment of the present invention, and correspond to the above-mentioned FIG. 12 and FIG. 13, respectively.

FIG. 4 shows, similar to FIG. 12, operation waveforms at the time when a temperature offset is generated in the voltage change of the detection signal C due to variation in the temperature coefficients of the magnetoresistive elements 2a, 2b, variation in the strength of the magnetic field impressed to the magnetoresistive elements 2a, 2b, or the like. In FIG. 4, individual detection signals C (R.T) and C" (HOT) are the individual detection signals c (R.T) and c' (HOT), respectively, in FIG. 12, and the final output signals Ki (R.T) and Ki (HOT) correspond to the final output signals i (R.T), and i' (HOT), respectively, in FIG. 12. As shown in FIG. 4, when the number of revolutions per minute of the magnetic movable element 3 is higher than a certain set value, a difference ΔKi between the temperature characteristics of the final output signals Ki and Ki can be made small (substantially "0") by using the AC-processed rectangular wave signals G and G' from the third comparison circuit 33.

FIG. 5 shows, similar to FIG. 13, operation waveforms at the times when the magnetic movable element 3 is at low speed rotation and at high speed rotation, respectively. In FIG. 5, individual signals D (high speed rotation), D' (low speed rotation), G (high speed rotation), G' (low speed rotation), K (high speed rotation), and K' (low speed rotation) correspond to individual signals d (high speed rotation), d' (low speed rotation), g (high speed rotation), g' (low speed rotation), j (high speed rotation), and j' (low speed rotation), respectively, in FIG. 13.

As shown in FIG. 5, by using the DC processed rectangular wave signals E, F from the first and second comparison circuits 31, 32 when the magnetic movable element 3 is at low speed rotation, and by using the AC processed rectangular wave signal G from the third comparison circuit 33 when the magnetic movable element 3 is at high speed rotation, the difference ΔK between the rotation number characteristics of the final output signals K and K' can be suppressed to a small value.

As described above, the magnetic detection apparatus according to the first embodiment of the present invention includes the sensor 2 (bridge circuit 10) in the form of the magnetoelectric conversion element comprising the magnetoresistive elements 2a, 2b for detecting the strength of a magnetic field, the first comparison circuit 31 that has the first comparison level VR1, and waveform shapes, through DC coupling, the amplitude of the detection signal C from the magnetoresistive elements 2a, 2b, the second comparison circuit 32 that has the second comparison level VR2, and waveform shapes, through DC coupling, the amplitude of the detection signal C from the magnetoresistive elements 2a, 2b, and the third comparison circuit 33 that has the third comparison level VR 3, and waveform shapes the amplitude of the detection signal C from the magnetoresistive elements 2a, 2b after AC coupling. With this arrangement, it becomes possible to make a selection between the AC coupling and the DC coupling, whereby the accuracy of the final output signal corresponding to the magnetic movable element 3 can be improved, thus making it possible to ensure excellent detection performance.

In addition, the first and second comparison levels VR1, VR2 of the first and second comparison circuits 31, 32 are set in such a manner that the third comparison level VR3 of the third comparison circuit 33 satisfies a relation of VR2<VR3<VR1. As a result, ranges for the DC processing and the AC processing, respectively, of the amplitude of the detection signal C from the magnetoresistive elements 2a, 2b can be set in an effective manner.

Further, the logical processing circuit 34 is provided for logically processing the respective output signals of the first, second and third comparison circuits 31 through 33, and the logical processing circuit 34 includes the transistor 41 that is turned on and off by the output signal of the first comparison circuit 31, the transistor 42 that is turned on and off by the output signal of the transistor 41, the transistor 43 that is connected in series to the transistor 41, and turned on and off by the output signal of the third comparison circuit 33, the transistor 44 that is connected in series to the transistor 42, and the transistor 45 that is turned on and off by the output signal of the second comparison circuit 32, wherein the transistor 44 is turned on and off by the output signal of the transistor 45, and the output signal of the transistor 42 is made as a final output signal. As a result, the accuracy of the final output signal K corresponding to irregularities of the magnetic movable element 3 can be improved.

While the invention has been described in terms of a preferred embodiment, those skilled in the art will recognize that the invention can be practiced with modifications within the spirit and scope of the appended claims.

What is claimed is:

1. A magnetic detection apparatus with a sensor composed of a magnetoelectric conversion element for detecting the strength of a magnetic field, said apparatus comprising:
    a first comparison circuit that has a first comparison level, and waveform shapes the amplitude of a detection signal from said magnetoelectric conversion element through DC coupling;
    a second comparison circuit that has a second comparison level, and waveform shapes the amplitude of the detection signal from said magnetoelectric conversion element through DC coupling; and
    a third comparison circuit that has a third comparison level, and waveform shapes the amplitude of the detection signal from said magnetoelectric conversion element after AC coupling.

2. The magnetic detection apparatus as set forth in claim 1, wherein said first and second comparison levels are set in such a manner that said third comparison level becomes between said first comparison level and said second comparison level.

3. The magnetic detection apparatus as set forth in claim 1, further comprising a logical processing circuit that logically processes the respective output signals of said first, second and third comparison circuits.

4. The magnetic detection apparatus as set forth in claim 3, wherein said logical processing circuit includes:
    a second transistor that is turned on and off by an output signal of said first transistor;
    a third transistor that is connected in series to said first transistor, and turned on and off by an output signal of said third comparison circuit;
    a fourth transistor that is connected in series to said second transistor; and
    a fifth transistor that is turned on and off by an output signal of said second comparison circuit;
    wherein said fourth transistor is turned on and off by an output signal of said fifth transistor, and an output signal of said second transistor is made as a final output signal.

* * * * *